Aug. 28, 1962    J. G. WATTS    3,051,075
BASKET STRUCTURE
Filed March 18, 1959    3 Sheets-Sheet 2

INVENTOR
JAMES G. WATTS

BY Learman, Learman + McCulloch

ATTORNEYS

Aug. 28, 1962  J. G. WATTS  3,051,075
BASKET STRUCTURE
Filed March 18, 1959  3 Sheets-Sheet 3
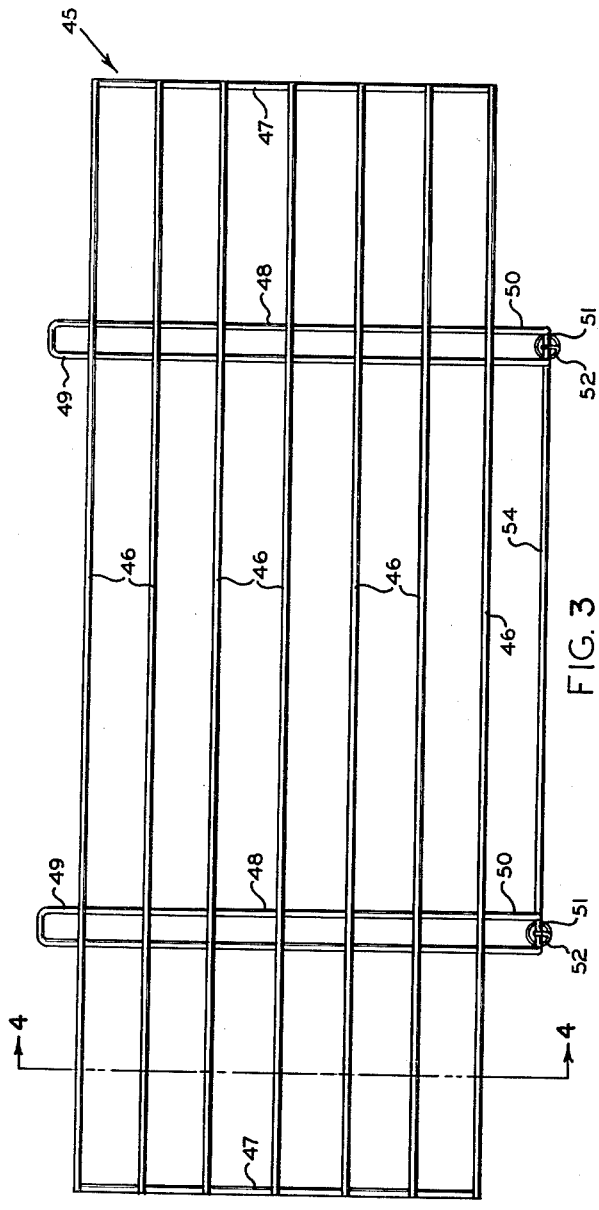
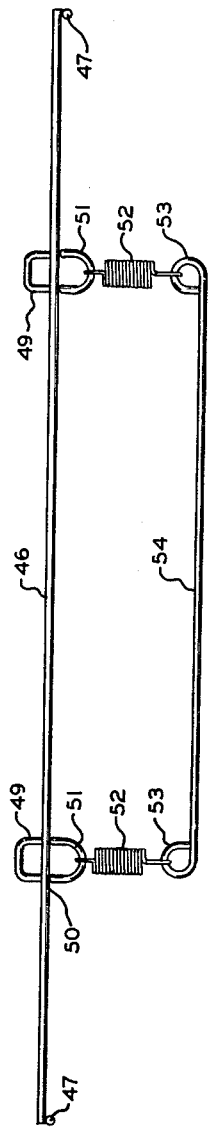
INVENTOR
JAMES G. WATTS
BY *Lemman, Lemman & McCulloch*
ATTORNEYS United States Patent Office 3,051,075
Patented Aug. 28, 1962

3,051,075
BASKET STRUCTURE
James G. Watts, Marathon, Fla., assignor of fifty percent to Bernard S. Frasik, Bay City, Mich.
Filed Mar. 18, 1959, Ser. No. 800,136
14 Claims. (Cl. 99—397)

This application is a continuation-in-part of application Serial No. 782,234, filed December 22, 1958.

This invention relates to basket constructions and more particularly to baskets of the kind adapted to be used in conjunction with charcoal grills and other cooking units to support meat or other edibles for rotation adjacent to an open fire or other source of heat so as to permit the edibles to be cooked.

Food articles of the kind adapted to be supported by a basket, as distinguished from being supported on a spit, usually are of such character that they may not be spitted. For example, cubed steaks are not readily conducive to being supported by a spit, nor are many other articles of food such as cut-up fowl. Accordingly, it has been proposed heretofore to grill such articles in baskets formed of wire or the like so that the food may be suspended and rotated adjacent to heat and be cooked without having to be spitted. Not all of the baskets in use heretofore have been entirely satisfactory, the principal objection to known baskets being their inability to prevent tumbling of the food articles in the basket as the latter is rotated. With baskets of the kind in use heretofore, it is not unusual to place meat, fowl, or other foods in the baskets in such manner that they initially are snugly held in place. As the basket is rotated over the fire, however, the meat or other food frequently shrinks, due to the escape of juices and general dehydration, and the shrinkage of the articles of food may be sufficiently great to enable them to tumble as the basket rotates. Tumbling of the food is objectionable because of the possibility that some of the food particles will escape from the basket and, moreover, the tumbling of the food frequently prevents its being cooked evenly throughout.

Another disadvantage of known baskets of the general class to which the invention relates is their lack of flexibility with respect to the quantity of food which may be cooked in them. The known baskets have consisted of single units requiring the spits or other supporting devices to be located substantially at the axes of rotation of the units. Consequently, only one basket unit can be supported at any one time on a spit and if more food is desired to be cooked than can be supported in the one unit, successive cooking operations must be conducted or a plurality of spits and units must be used. Baskets constructed according to the present invention, however, comprise a plurality of units, any or all of which may be used so as to cook a desired quantity of food, up to the maximum capacity of all units, on one spit.

An object of this invention is to provide a basket construction adapted to be rotated over a charcoal or the like fire and which is capable of supporting articles of food in such manner as to prevent tumbling.

Another object of the invention is to provide a basket construction of the kind referred to in which articles of food contained therein are yieldably maintained in fixed relation to the basket throughout the cooking process.

A further object of the invention is to provide a basket construction adapted to hold articles of food and in which the basket may be quickly and easily loaded and unloaded.

A further object of the invention is to provide a barbecue basket construction which is capable of use selectively in single or plural units.

Another object of the invention is the provision of a multiple unit basket construction which quickly and easily may be assembled and disassembled.

A still further object of the invention is to provide a multiple unit barbecue basket construction wherein the individual units are so constructed and arranged that, when used in multiple units, food contained therein to be cooked may be exposed substantially uniformly to heat.

Still another object of the invention is to provide a basket construction of the kind described which is simple in construction and operation and yet rugged and durable in use.

Other objects and advantages of the invention will be referred to specifically or will become apparent from the following description when it is considered in conjunction with the appended claims and the accompanying drawings, in which:

FIGURE 3 is a top plan view of a lid or top portion;

FIGURE 4 is a sectional view taken on the line 4—4 of FIGURE 3;

FIGURE 5 is a side elevational view of the apparatus shown in FIGURE 3;

Figure 1:
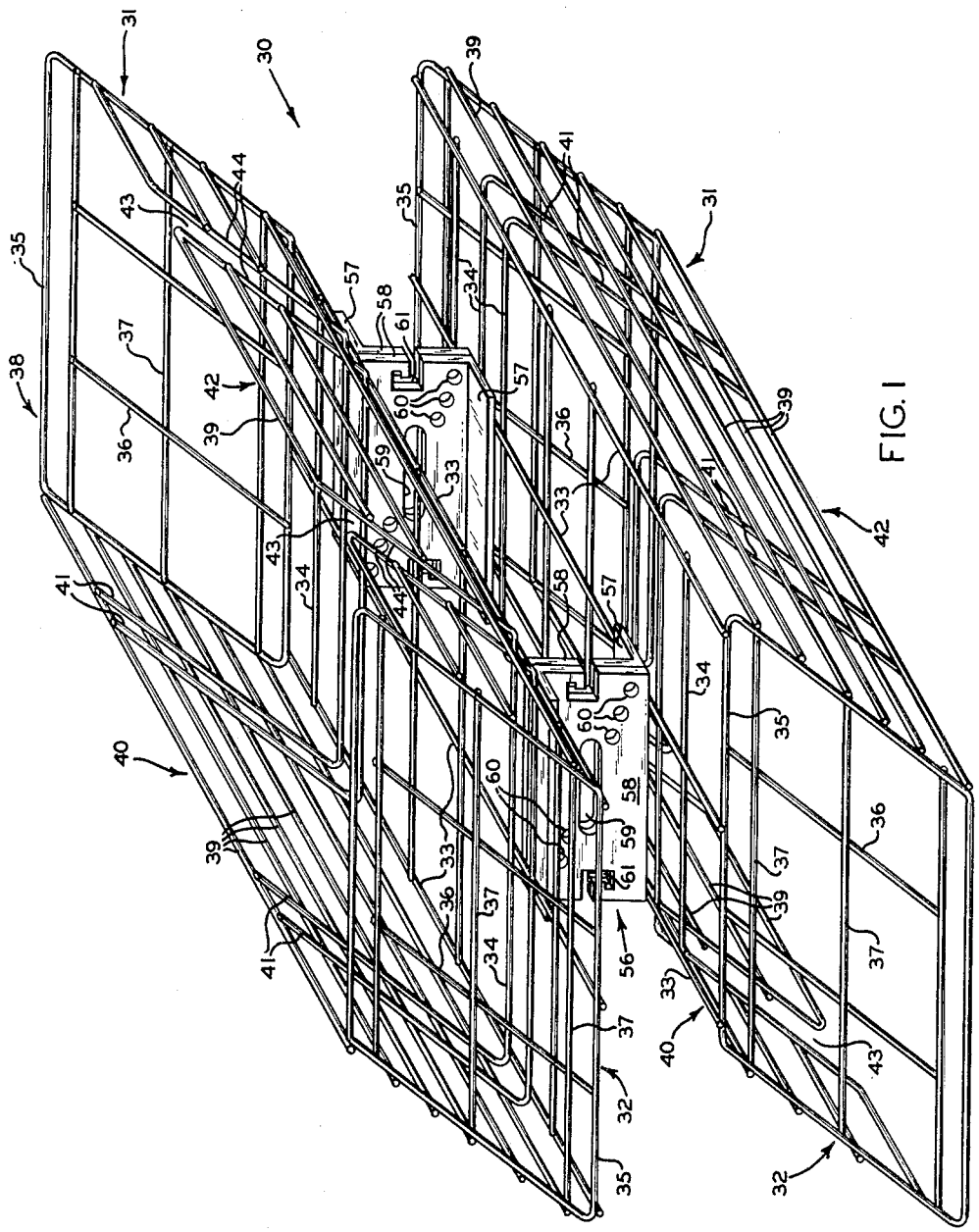
FIGURE 1 is an isometric view of one embodiment of the invention, the lids or top sections being removed for the sake of clarity.

The embodiment of the invention shown in FIGURES 1 through 8 is similar in many respects to the embodiment disclosed in application Serial No. 782,234, but differs from the latter in certain important aspects. Referring firstly to FIGURE 1, the basket structure is indicated generally by the reference character 30 and comprises a pair of similar units 31 which are separably coupled together by means yet to be described. Each unit 31 is similar, so only one need be described in detail.

Each basket unit 31 includes a flat, substantially planar, bottom portion 32 composed of a plurality of longitudinally extending stringers 33 welded or otherwise suitably secured to cross bars 34, the stringers 33 being connected at their opposite ends to quadrangular frame elements 35 which similarly are equipped with wire rods 36 and cross rods 37 so arranged as to provide substantially planar, opposed end portions 38 for the units 31. Connecting corresponding sides of the end portions 38 of each unit 31 is a plurality of longitudinally extending stringers 39 which form a flat, substantially planar side portion 40, the stringers 39 being reinforced by a number of cross rods 41 which may be continuations of the cross members 34, if desired. Opposite the side portion 40 is a generally parallel, planar side portion 42 which is generally similar to the side 40 except that the stringers 39 are interrupted at suitable intervals along their lengths so as to provide a number of open channels 43 for a purpose presently to be explained. The channels 43 preferably are formed by vertical cross bars 44 spaced according to the spacing of the cross bars 41.

Figure 2:
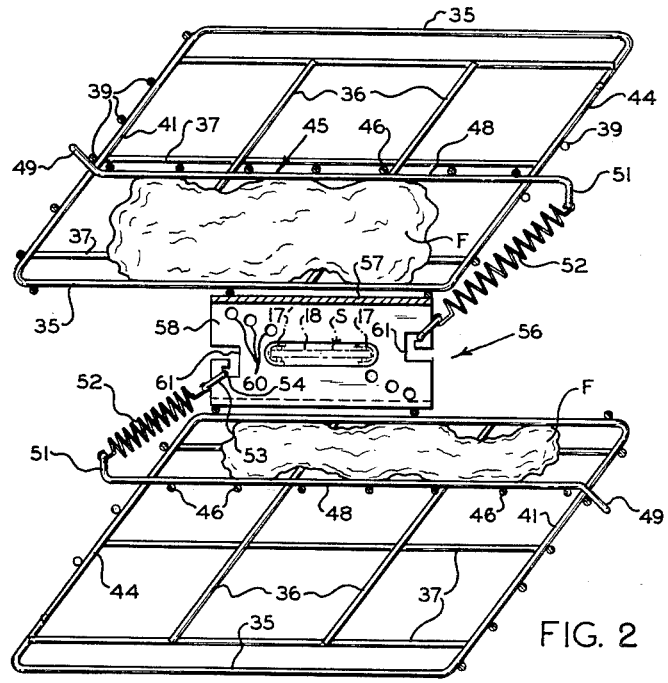
FIGURE 2 is a transverse sectional view of the structure shown in FIGURE 1 with the lids in place.
Figure 6:
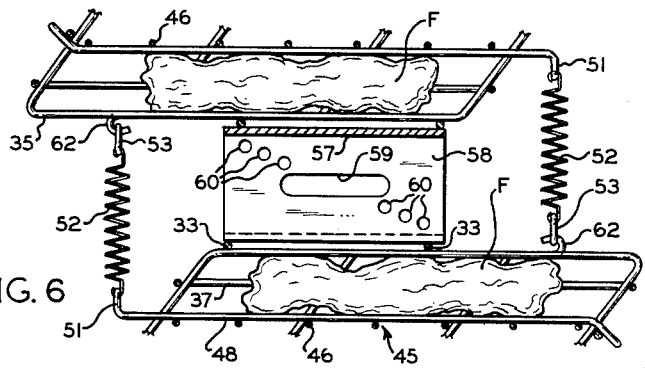
FIGURE 6 is a fragmentary, sectional view similar to FIGURE 2, but disclosing a modified form of lid connecting means.

As is most clearly shown in FIGURES 1 and 2, the side and end walls of each unit 31 are so inclined to the plane of the associated bottom member that each unit, in end elevation, is a parallelogram presenting a substantially diamond-shaped appearance. The particular significance of this configuration will be pointed out hereinafter, but it is convenient at this point to state that each acute angle between the horizontal portion of the frame element 35 and the adjacent portion of the frame element preferably is between 45° and 60°.

Each of the basket units 31 is adapted to receive a generally rectangular lid or top portion 45 which is best disclosed in FIGURES 3–5. Each lid 45 comprises parallel wire rods 46 welded or otherwise suitably secured at their ends to end bars 47, the arrangement being such that the lid parts 46 and 47 present a substantially rectangular appearance, in plan, and are of such size as to permit the lid parts 46 and 47 to be placed within their respective basket units. Forming parts of the lids 45, however, are wire loop elements 48 secured to the bars 46 by welding or the like and having portions 49 projecting from one side of each lid a distance sufficient to protrude between and beyond the stringers 39 and the cross bars 41 of the side portion 40, the projecting parts 49 being canted as shown in FIGURES 2 and 4 so as to constitute hook-like elements adapted to engage the stringers 39 of the side portion 40. At the other side of each lid the loop elements 48 are provided with extensions 50 of such size as to be received in the channels 43 of the side portion 42 and project beyond the plane of the latter. The ends of the extensions 50 are formed as semi-circular loop portions 51 to which are connected corresponding ends of tension springs 52, the other ends of the springs being secured to loops 53 formed at the ends of a latch or coupling bar 54 forming part of anchoring means for the lids 45.

In the embodiment of the invention shown in FIGURES 1 and 2, coupling means is provided for separably coupling the basket units 31 together and comprises a plurality of identical, L-shaped coupling elements 56. In the disclosed embodiment there are four coupling elements 56, but more may be used if desired. The arrangement of the elements 56 is such that the corresponding flanges 57 of a pair of elements 56 are welded or otherwise suitably fixed to the bottom portion 32 of one of the basket units 31 in such manner that the other flanges 58 project away from that unit, and the flanges 57 of the other pair of elements 56 are similarly fixed to the bottom portion of the other basket unit. The spacing of the elements 56 is such that when the bottom portions 32 of two units 31 are placed adjacent to one another with the end portions 38 in alignment, the flanges 58 of the pairs of elements 56 will be in face-to-face engagement as is illustrated in FIGURE 1 so as to constitute attaching means for the two basket units.

Each of the attaching flanges 58 of the coupling elements 56 is provided with an elongate opening or slot 59 therein which is so located as to be aligned with the slots 59 in the other coupling elements when the basket units are arranged as shown in FIGURE 1. With the basket units so arranged relatively to one another, the spit S of the kind more particularly described in co-pending application Serial No. 714,977, filed February 13, 1958, now abandoned, may be run through the openings 59 of the several elements 56, and then the arms 17 and 17' of the spit may be moved or spread apart so as to engage opposite ends of the slots 59 whereupon the basket units 31 will be securely supported on the spit with the bottom portions 32 of the baskets adjacent to but spaced from one another a distance corresponding to the length of the flanges 58.

It is not essential to the invention that the spit disclosed in the above identified co-pending application be used. Conventional spits of the kind comprising a single, solid rod (not shown) and equipped with generally U-shaped fork elements (not shown) may be used, in which event the rod will be inserted through the slots 59 of the coupling elements 56. In order to prevent relative rotation between the rod of a conventional spit and the basket units 31, the flanges 58 of the elements 56 may be provided with a plurality of openings 60 for reception of the tines of the fork members. A plurality of openings 60 is provided so that forks of varying size may be used with the apparatus.

The arrangement of the coupling elements 56 on their respective basket units 31 is such that, when plural basket units are used, one unit will be offset with respect to the other as indicated in FIGURE 2. The amount of offset should be such that when the units are vertically arranged, as shown in FIGURE 2, a vertical plane will touch both the top edge of one basket unit and the bottom edge of the other unit. The advantage of this construction will be referred to subsequently.

If desired, each of the coupling elements 56 may have a substantially J-shaped notch 61 cut in the flange 58 to receive and anchor the latch bar of the basket lids 45. The slots 61 are not essential, however, since other anchoring means may be employed. For example, wire hook elements 62 may be welded or otherwise fixed to the basket units 31 in such position as to receive and removably anchor the latch bars 54 in the manner indicated in FIGURE 6. In this construction the basket coupling means may be identical to the coupling elements 56, with the exception of the slots 61, but other kinds of coupling elements may be used irrespective of the manner in which the latch bars 54 of the lid portions are anchored. For example, modified coupling means of the kind shown in FIGURES 7 and 8 may be used. In this construction, the coupling means comprises a substantially Z-shaped bracket 63 having corresponding flanges 64 welded or otherwise suitably fixed to the bottom portion 32 of the same basket unit. Each bracket 63 includes a web 65 which extends beyond the flange 64 and terminates in a right angular flange 66, the flanges 66 of the brackets 63 extending in the same direction from their respective webs 65. To the bottom portion of the other basket unit 31 is fixed a pair of metal strap members 67 each having end flanges 68 welded or otherwise secured to the bottom wires 33, the flanges being spaced from one another by an offset central portion 69 which, with the wire members 33 of the basket unit, forms a socket 70 for reception of the associated flange 66.

Figure 7:
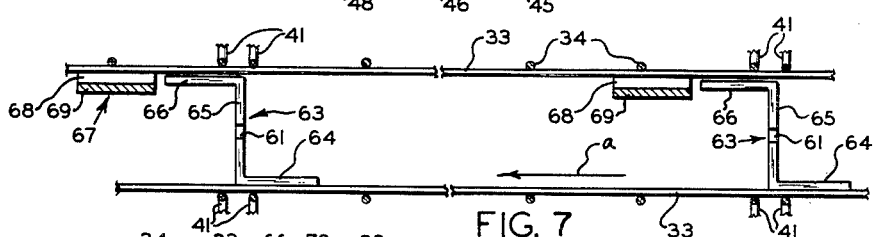
FIGURE 7 is a fragmentary, longitudinal sectional view illustrating a modified form of device for separably coupling the two basket units.
Figure 8:
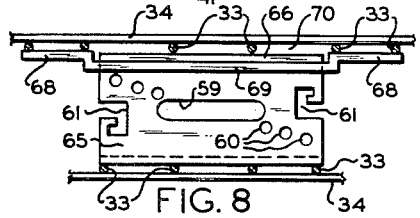
FIGURE 8 is a view similar to FIGURE 6, but illustrating the construction shown in FIGURE 7.

To assemble the basket structures 31 shown in FIGURES 7 and 8 into a single unit, the flanges 66 are aligned with the respective sockets 70 whereupon one unit 31 is moved relatively to the other in the direction of the arrow $a$ in FIGURE 7 so as to insert the flanges 66 in the sockets 70. The flanges 66 preferably fit rather snugly in their sockets 70 to preclude inadvertent separation of the units 31. The webs 65 of the members 63 may be provided with spit-receiving openings 59, fork accommodating openings 60, and notches 61 similar to the corresponding elements of the parts 56. Alternatively, the notches 61 may be eliminated in favor of anchoring devices such as the parts 62 shown in FIGURE 6.

Any of the structures shown in FIGURES 1–8 may be used either singly or in plural units. When used in plural units, the individual baskets 31 are arranged with their bottom portions adjacent to one another and are supported on a table or the like in such manner that at least one of the units is open upwardly. Small pieces of food F such as cut-up fowl may be placed in the upper basket unit and the associated lid 45 then may be inserted in the unit in such manner that the hook elements 49 extend between adjacent stringers 39 and between adjacent pairs of bars 41. The particular pair of stringers 39 between which the hook portions 49 extend should be so selected that the foodstuffs in the basket will be placed under slight compression by the lid portion 45 when it is anchored in place. When the one side of the lid portion is secured by means of the hook element 49, the extensions 50 will protrude through the channels 43. The latch bar 54 then may be anchored to the anchor apparatus 61 or 62 whereupon the springs 52 will be stretched to exert a yieldable force on the lid 45 tending to move it towards the bottom of the basket, thereby maintaining the foodstuff under compression. When one basket unit has been filled and equipped with its movable closure member, the assembly may be turned over and the other unit similarly may be filled and closed. In this connection, it is not essential that both basket units be filled to the same level. Instead, each basket may be filled to a different level, if desired, as is indicated in FIGURE 2.

When the basket units have been filled to the desired level, the assembly may be mounted on a spit and supported for rotation adjacent to cooking heat. As the spit rotates, the basket units also will rotate. Owing to the shape of the individual units 31 and their offset relation, heat from the source of heat not only will strike those portions of the food which are adjacent to the closure members 45 and the side edges of the food, but also will be permitted, during rotation of the baskets, to strike that portion of the food which is directly adjacent to the bottom of each basket structure. Accordingly, food which is cooked in baskets of the kind disclosed in FIGURES 1 through 8 may be cooked quite evenly around all four sides of each basket structure, even though the baskets are used in plural units.

Inasmuch as the individual units are separable from one another, it is possible to use only one basket unit when the quantity of food desired to be cooked is not sufficient to require plural units. The separability of the apparatus into its component units not only prevents the unnecessary soiling of basket units when no more than one is required, but also aids in cleaning the basket structures after use and in economizing on storage space.

In all of the embodiments disclosed herein, it will be noted that the spit with which a basket is adapted for use at no time passes through the interior of any basket unit. Accordingly, no food space need be sacrificed in order to mount the units on a spit, nor is there any interference from the spit with the compression of the foodstuffs in the baskets.

The disclosed embodiments are representative of presently preferred forms of the invention but are intended to be illustrative rather than definitive thereof. The invention is defined in the claims.

I claim:

1. A basket construction comprising a first body including opposed, substantially planar top and bottom grid portions and opposed, spaced apart, substantially planar side grid portions joined to said bottom grid portion and extending therefrom; a second body similar to said first body and including opposed, substantially planar top and bottom grid portions and opposed, spaced apart, substantially planar side grid portions, said first and second bodies being arranged with their bottom portions adjacent and substantially parallel to one another; mounting means secured to each of said bodies and extending beyond the bottom grid portion of its associated body; and means joining the mounting means of said bodies and separably connecting said bodies together.

2. The construction set forth in claim 1 wherein said mounting means comprises an anchor member on the bottom grid portion of one of said bodies and a cooperable attaching member on the bottom grid portion of the other of said bodies removably secured to said anchor member.

3. The construction set forth in claim 1 wherein said mounting means comprises an attaching member on the bottom grid portion of one of said bodies and a similar attaching member on the bottom grid portion of the other of said bodies.

4. The construction set forth in claim 1 wherein said mounting means includes means between the bottom grid portion of said bodies for mounting said bodies on a spit.

5. A basket construction comprising a first body including spaced apart, opposed, substantially planar, top and bottom portions and spaced apart, substantially planar, opposed side portions, said bottom portion and said side portions being joined one to another and said top portion being capable of movement relative to the other portions; first yieldable means connected to said top portion operable yieldably to urge the latter towards said bottom portion; a second body including spaced apart, opposed, substantially planar, top and bottom portions and spaced apart, substantially planar, opposed side portions, said side portions and said bottom portion of said second body being joined to one another and the top portion of said second body being capable of movement relative to the other portions thereof, said first and second bodies being arranged with their bottom portions adjacent and substantially parallel to one another; second yieldable means connected to said top portion of said second body operable yieldably to urge the top portion thereof towards the bottom portion of said second body; and mounting means secured to each of said bodies and extending beyond the bottom portion of its associated body so as to be interposed between said bodies, the mounting means of said bodies being separably joined to one another.

6. The construction set forth in claim 5 wherein said mounting means comprises cooperable fastening elements mounted on each of said bottom portions.

7. The construction set forth in claim 6 wherein said cooperable fastening elements comprise a socket element on one of said bottom portions and a connecting element on the other of said bottom portions removably received in said socket element.

8. The construction set forth in claim 6 wherein said cooperable fastening elements comprise an attaching element fixed to and extending beyond one of said bottom portions towards the other and a similar attaching element fixed to and extending beyond the other bottom portion towards said one bottom portion, said attaching elements having aligned openings for reception of a spit.

9. The construction set forth in claim 6 wherein the side portions of each of said bodies are parallel to one another and inclined to their respective bottom portions so that each body presents a substantially diamond shaped appearance in end elevation.

10. The construction set forth in claim 9 wherein the mounting means for each of said bodies is offset to one side edge thereof an amount such that the perimeter of the bottom portion of either of said bodies is bounded by the same planes that bound the perimeter of the side portions of the other body adjacent to its top edge.

11. An open top barbecue basket construction comprising a substantially flat, planar bottom member; a pair of substantially flat, parallel, planar side wall members joined to opposite side edges of said bottom member and extending in the same direction beyond and inclined less than 90° to the plane of the latter so that one of said side wall members overhangs one side edge of said bottom member and the other of said side wall members overhangs said bottom member; a pair of substantially flat, parallel, planar end wall members joined to opposite end edges of said bottom member and extending in said direction from said bottom member, said end wall members having side edges inclined to correspond to the inclination of said side wall members, whereby said basket presents substantially a diamond-shaped appearance in end elevation; spaced apart supporting means carried by one of said members offset from the center of said bottom member toward said one side edge of said bottom member and projecting beyond said bottom member in a direction opposite said first mentioned direction for mounting said basket on another basket, said one side wall member extending beyond said supporting means; a removable cover element forming a closure for the open top of said basket; and means connected to said cover element and removably securing the latter at least to one of said members, all of said members and said cover element being formed of spaced apart wires.

12. The construction set forth in claim 11 including yieldable means connected to said top member and yieldably urging the latter towards said bottom member.

13. The construction set forth in claim 11 wherein said supporting means comprises at least one member having a spit accommodating opening therein.

14. A barbecue basket construction comprising a pair of similar bodies each composed of a flat, substantially planar bottom member, a pair of opposed, parallel side wall members extending from said bottom member and being inclined less than 90° thereto so that one side wall member overhangs said bottom member and the other side wall member overhangs one edge of said bottom member; and opposed, substantially parallel end wall members extending from said bottom member, said members of each of said bodies forming an open top receptacle; mounting means on one of said members of each of said bodies and offset toward said one edge of the associated bottom member; and means connecting the mounting means of each of said bodies and holding said bodies in such position that the bottom member of one body is adjacent and substantially parallel to the bottom member of the other body.

References Cited in the file of this patent
UNITED STATES PATENTS

| | | |
|---|---|---|
| 870,894 | MacDougall | Nov. 12, 1907 |
| 1,794,870 | Serrell | Mar. 3, 1931 |
| 2,320,304 | Rosset | May 25, 1943 |
| 2,607,286 | Krissel | Aug. 19, 1952 |
| 2,735,358 | Gilbert | Feb. 21, 1956 |
| 2,747,497 | Brown | May 29, 1956 |
| 2,760,428 | Boyajian | Aug. 28, 1956 |
| 2,839,989 | Persinger | June 24, 1958 |
| 2,846,941 | Goodwin | Aug. 12, 1958 |
| 2,895,408 | Glenny | July 21, 1959 |